United States Patent Office 3,702,307
Patented Nov. 7, 1972

3,702,307
HYDRATED EMULSIFIERS FOR BAKERY PRODUCTS
Max E. Norris, Parma, Ohio, assignor to SCM Corporation, Cleveland, Ohio
No Drawing. Filed July 27, 1970, Ser. No. 58,717
Int. Cl. B01f 17/34
U.S. Cl. 252—356  7 Claims

ABSTRACT OF THE DISCLOSURE

A hydrated emulsifier containing from about 20–30% water, 20–30% of an ethoxylated partial fatty acid ester of polyhydric alcohol, from 35–45% of a partial fatty acid ester of polyglycerol and from 9–16% of a partial fatty acid ester of propylene glycol is set forth. The emulsifier contains a relatively low amount of water but yet provides for the making of sponge cakes of high specific volume.

---

Hydrated emulsifiers for bakery goods such as cakes are well known and widely used. Typically one type of hydrated emulsifier comprised water, a propylene glycol monoester or glycol ester, fat, and a small amount of another emulsifier; another type comprised water and a monoglyceride. These emulsifiers are highly desirable becaues of their activity and functionality at low temperatures (70° F.) for producing products having low specific gravity and because they can be blended with dry mixes for making bakery products at room temperature. When the emulsifier systems are not hydrated, they generally must be melted, usually at temperatures above 125° F., for blending. At this temperature, blending of the emulsifier with dry mix is almost impossible. Additionally, if heat-sensitive ingredients such as egg yolk are present, the temperatures employed for blending the non-hydrated emulsifier often interfere with the final product and/or additionally tend to slightly cook or degrade these heat-sensitive ingredients.

Heretofore, the above hydrated emulsifiers contained about 60–70% water by weight. Although the first type of emulsifier might have contained less water (27%), this type of emulsifier contained a large proportion of fat and in certain applications, it is preferred that no fat be present during the initial blending of emulsifier and dry mix and that the fat be added at the completion. Hydrated emulsifiers containing from 60–70% water are undesirable primarily because freight costs become high for such a high water-containing product. Many of the users of emulsifiers, therefore, chose to purchase the emulsifiers and hydrate the emulsifiers to avoid the high shipping costs, etc., which, of course, affected suppliers of emulsifier.

Advantages of the emulsifier set forth herein include: low water content of from about 20–30% water or about ½ of the water content normally found in hydrate emulsifiers, excellent functionality for preparing cake batters of low specific gravity and cakes of high specific volume; capability of blending with dry mixes at temperatures of 70° F.; and dispersibility in water at temperatures of 70°–75° F.

The hydrated emulsifier of this invention comprises, basis weight of the composition, from about 20–30% water, from about 20–30% of an ethoxylated partial fatty acid ester of a polyhydric alcohol having from 3–6 carbon atoms, said ester containing from about 10–30 ethylene oxide units per mole of polyhydric alcohol, 35–45% of a partial fatty acid ester of polyglycerol, and from 9–16% of a partial fatty acid ester of propylene glycol.

The emulsifier is particularly adapted for making shortenings for use in baked goods. Cakes are a specific example of baked goods that can be made with these shortenings. Broadly from about 0.5.5% emulsifier basis weight of cake ingredients including water is employed, but normally the amount is between 1.5–2.5%.

The ethoxylated esters that can be employed in this emulsifier are the conventional ethoxylated emulsifiers used in making bakery goods. These esters typically are produced by reacting ethylene oxide with a polyhydric alcohol such as glycerol, mannitol, sorbitol, and the like, and then reacting this product with a fatty acid having from about 12–24 carbon atoms. They can also be produced by ethoxylating the fatty acid ester of the polyhydric alcohol as is shown in U.S. Pats. 3,433,645 and 3,409,918.

Generally from about 10–30 moles of ethylene oxide are reacted with one mole of polyhydric alcohol and, generally for food applications, the value is generally between 15–20 moles ethylene oxide per one mole of polyhydric alcohol. Examples of specific ethoxylated partial fatty acid esters of polyhydric alcohols include ethoxylated mono and diglycerides, polyoxyethylene sorbitol and sorbitan mono and di-esters, polyoxyethylene mannitol and mannitan mono and diesters, and the like. Fatty acids which can be reacted with the ethoxylated polyhydric alcohol product for forming the ester include those having from 12–20 carbon atoms such as lauric acid, stearic acid, palmitic acid and oleic acid. For reasons of efficiency and economy, polysorbate 60 is the preferred ethoxylated emulsifier.

By partial ester it is meant those esters not fully acylated. The partial esters generally are better adapted for aerating and stabilizing emulsions for making cakes and other bakery goods as opposed to the fully-acylated counterparts. In practicing the invention, it is preferred that these esters be esentially mono-esters. Although the emulsifiers may consist of a mixture of esters, it is preferred for reasons of efficiency and economy that the ester not contain substantially more than about 30% of di-ester and not more than about 3% of tri-ester and above. Hydroxyl, acid and saponification values often are used to indicate the degree of acylation of the ester. Typical values for ethoxylated monoglyceride are 65–80 hydroxyl value, 2.0 acid value maximum, and 65–75 saponification value. Polysorbate 60 typically has hydroxyl value of 81–96, a saponification value of 45–55 and an acid value of 2.0 maximum.

The exthoxylated partial fatty acid esters of the polyhydric alcohol are employed in a proporation of from 20–30% by weight of the emulsifier composition. When less than about 20% of the ethoxylated ester is employed, the emulsifier does not possess the desired plasticity. In addition the emulsifier does not possess desired functionality. By functionality it is meant the ability to aerate and to stabilize the emulsion. When the proportion of ethoxylated ester exceeds about 30%, the emulsifier composition generally does not entrap sufficient air in the cake batter to produce a cake having desired specific volume or areation.

Partial fatty acid esters of polyglycerol are well known and widely used as food emulsifiers. They are generally prepared from edible fats and oils and the fatty acids derived therefrom, such as corn oil, cottonseed oil, lard, peanut oil, safflower oil, sesame oil, soya bean oil, tallow, and stearic, oleic and coconut fatty acids. The polyglycerol esters are formed by polymerizing glycerol and esterifying these polymerized glycerol products with fatty acid or glycerides to form the polyglycerol ester product. For food use, the polyglycerol esters usually contain polymerized glycerin up to and including decaglycerol esters. For reasons of efficiency and economy, the preferred polyglycerol esters contain from about 3-5 glycerol molecules and, when esterified, have a molecular weight of from about 500-650 and preferably between about 550-625. Of course, it will be apparent that the molecular weight of the fatty acid used to esterify the polyglycerol molecule has an important bearing on the resulting molecular weight of the polyglycerol ester and, therefore, the number of glycerol molecules in the polymer. For example, where the fatty acid is stearic acid, the polyglycerol ester preferably usually will contain about three glycerol molecules but, where the fatty acid is oleic acid, then the polyglycerol ester usually will contain about 5 glycerol molecules.

By partial fatty acid esters of polyglycerol it is meant those esters wherein only a portion of the hydroxyl groups on the polyglycerol ester are acylated. Preferably those polyglycerol esters are the mono, di and tri-esters and generally containing not more than about 40% of di-ester and 10% of tri-ester. Average hydroxyl values for triglycerol monostearate, a typical polyglycerol ester, are 333–358; saponification values are 122–139 and acid values are 4.0 maximum. The mono-esters are preferred to the di and tri-ester because they seem to have better ability to aerate and stabilize the emulsion used in forming the bakery product. Moreover, when the fatty acid content increases in the emulsifier, the emulsifier becomes increasingly difficult to disperse in water especially at low temperatures (80° F.). Typical partial esters of polyglycerol include triglycerol monostearate, mono-oleate, monopalmitate, pentaglycerol oleate, stearate and palmitate, hexaglycerol oleate, stearate and plamitate, etc. For reasons of efficiency and economy, the preferred partial fatty acid ester of polyglycerol is essentially triglycerol monostearate.

Partial fatty acid esters of propylene glycol are well known and have been used in making hydrated emulsifiers. Typical examples of the propylene glycol esters are the mono and di-esters of peanut oil, soya bean oil, corn oil, or mixtures thereof, or the fatty acid esters derived from stearic, oleic and palmitic acids. Examples of partial fatty acid esters of propylene glycol include propylene glycol lactostearate, propylene glycol monostearate, propylene glycol monopalmitate, propylene glycol monooleate. The preferred fatty acid ester of propylene glycol for practicing this invention is propylene glycol monostearate. As with the previous emulsifiers, the preferred esters are the partial esters of propylene glycol and for reasons of efficiency and economy should not contain more than about 30% of the di-ester.

Optionally there can be included conventional emulsifiers for bakery products in this emulsifier composition. Generally up to and about 10% by weight of the emulsifier will not be detrimental to the overall effectiveness of the hydrated emulsifiers. These emulsifiers include mono and diglyceride, alkali metal stearates and oleates, sodium stearate, sodium oleate, hydroxy aliphatic fatty acid esters of glycerol such as glycerol lactopalmitate, propylene glycol lactostearate, and the like. Preferably no other emulsifiers are used.

One of the key features to the invention is in the amount of water used to hydrate this particular emulsifier for rendering it functional at temperatures of about 70° F. When the water content falls below about 22% by weight, the emulsifier loses its functionality, i.e., the ability for substantially aerating the batter and for effecting stabilization thereof. The specific gravity of a cake batter generally increases substantially as the water content falls below about 20% by weight thereby producing a cake, for example, having relatively low specific volume. When the water content exceeds about 30% by weight, the functionality of the emulsifier tends to decrease. Therefore, it is preferred in a minimally hydrated emulsifier to maintain the water at a relatively low percentage, that is below about 30% by weight, while at the same time achieving desirable and optimum functionality. The preferred water content is between about 23–26% by weight because lowest specific gravities for the cake batter and highest cake volumes are obtained.

The following specific examples are intended to illustrate preferred embodiments of this invention but are not intended to limit the scope thereof. All parts are parts by weight, all percentages are weight percentages, and all degrees are degrees Fahrenheit, unless othewise specified.

EXAMPLE 1

Preparation of the emulsifier

Twenty-three parts of polysorbate 60 are charged to a vessel containing 25 parts water. The polysorbate 60 and water are vigorously agitated until the polysorbate is dispersed. In a separate vessel, 38.5 parts of triglycerol monostearate and 13.5 parts propylene glycol monostearate are charged to a vessel and heated to a temperature of 160 °F. Both emulsifiers can be melted at this temperature to form a liquid. The liquid then is blended until a homogeneous liquid emulsifier is obtained. This liquid emulsifier then is charged to the water-polysorbate dispersion and agitated with a Hobart mixer. After about five minutes, the water is physically absorbed by the components and a semi-solid emulsifier is formed. The emulsifier is readily dispersible in water at 75° F.

EXAMPLE 2

Yellow sponge cakes are prepared from the following ingredients:

| | Parts |
|---|---|
| Sugar | 449 |
| Corn syrup | 90 |
| Cake flour | 476 |
| Soya flour | 25 |
| Baking powder | 27 |
| Cream of tartar | 1.25 |
| Whole egg solids | 16 |
| Egg white solids | 13 |
| Whey solids | 29 |
| Salt | 6 |
| Water | 600 |
| Emulsifier of Example 1 | 8 |

To a first vessel equipped with an agitator, the dry ingredients listed, e.g., sugar, cake flour, soya flour, baking powder, cream of tartar, whole egg solids, egg white solids, whey solids and salt, are blended until thoroughly mixed. In a second vessel the corn syrup is blended with the water to form a dispersion. After the dry materials are thoroughly mixed, the 8 parts of emulsifier of Example 1 are added to the dry blended material in the first vessel, followed by the addition of 230 parts of the water dispersion and corn syrup. The contents are mixed for a period of about 30 seconds or until a relatively homogeneous dispersion is obtained. Then, another 230 parts of the water dispersion are added and mixed for 30 seconds to one minute. Then, the remaining 230 parts of water dispersion are added and the contents mixed until the materials are thoroughly blended. The cake possesses excellent taste and is desirably tender.

A total of three additional cakes are prepared in like manner except for the substitution of a commercial hydrated monoglyceride emulsifier system containing 75% water and 25% monoglyceride. The cake batter for each cake and the cake itself are evaluated for specific gravity and cake volume. The table below shows the three cake systems with the commercial emulsifier and the three cake systems employing the emulsifier of Example 1. The specific gravity in grams per cubic centimeter (g./cc.) and cake volume in cubic centimeters per pound (cc./lb.) are given.

TABLE I

| Cakes with commercial emulsifier cake system | Specific gravity, g./cc. | Cake volume, cc./lb. |
|---|---|---|
| Cake: | | |
| 1 | 0.67 | 1,471 |
| 2 | 0.62 | 1,423 |
| 3 | 0.65 | 1,476 |
| Cakes with emulsifier of Example 1 | | |
| Cake: | | |
| 1 | 0.54 | 1,539 |
| 2 | 0.59 | 1,486 |
| 3 | 0.55 | 1,557 |

The above results show that yellow sponge cakes empoying the minimally hydrated emulsifier system of Example 1 produce cake batters having lower specific gravity and higher cake volume than cake batters and cakes produced with a commercial hydrated emulsified system.

EXAMPLE 3

Excellent cakes are achieved when using an emulsifier prepared in accordance with the manner of Example 1 except for the substitution of 23 parts of an ethoxylated monoglyceride having 20 ethoxy units per mole of glycerin.

EXAMPLE 4

An excellent cake is achieved wherein the emulsifier of Example 1 is produced in like manner except that an identical amount of propylene glycol lactostearate is substituted for the propylene glycol monostearate.

What is claimed is:

1. An emulsifier composition comprising basis weight of the composition (a) from about 20–30% water, (b) 20–30% of an ethoxylated partial fatty ester of a polyhydric alcohol having from 3–6 carbon atoms, said ester containing from about 10–30 ethylene oxide units per mole of polyhydric alcohol, said fatty acid portion being selected from the group consisting of lauric, stearic, palmitic, and oleic acids, (c) 35–45% of a partial fatty acid ester of polyglycerol, said fatty acid portion being selected from the group consisting of stearic, palmitic, oleic acids, and (d) 9–16% of a partial fatty acid ester of propylene glycol, said fatty acid portion being selected from the group consisting of stearic, palmitic, and oleic, and lactylated esters of same.

2. The emulsifier of claim 1 wherein said polyhydric alcohol is glycerol.

3. The emulsifier of claim 1 wherein said polyhydric alcohol is sorbitol or sorbitan.

4. The emulsifier of claim 2 wherein said partial fatty acid ester of propylene glycol is essentially propylene glycol monostearate.

5. The emusifier of claim 4 wherein said partial fatty acid ester of polyglycerol is essentially a polyglycerol stearate or palmitate or mixture thereof.

6. The emulsifier of claim 5 containing water in an amount between 23–26%.

7. The emulsifier of claim 6 having 25% water, 23% polysorbate 60, 38.5% triglycerol monostearate, and 13.5% propylene glycol monostearate.

References Cited

UNITED STATES PATENTS

| Re. 21,322 | 1/1940 | Harris | 252—356 X |
| 2,380,166 | 7/1945 | Griffin | 252—356 X |
| 2,508,393 | 5/1950 | Jaeger | 99—123 |
| 3,034,898 | 5/1962 | Kuhrt et al. | 252—356 X |

RICHARD D. LOVERING, Primary Examiner

U.S. Cl. X.R.

99—92; 252—DIG. 1